United States Patent [19]
Clemett, Jr.

[11] 3,737,207
[45] June 5, 1973

[54] ASH TRAY ASSEMBLY

[75] Inventor: Edwin F. Clemett, Jr., Detroit, Mich.

[73] Assignee: McCord Corporation, Detroit, Mich. Mich.

[22] Filed: Nov. 19, 1971

[21] Appl. No.: 200,493

[52] U.S. Cl...............................................312/246
[51] Int. Cl............................A47b 67/02, A47f 5/08
[58] Field of Search.....................312/246, 242, 328, 312/307, 322, 323, 270, 350; 906/19.5 T

[56] References Cited

UNITED STATES PATENTS

| | | | |
|---|---|---|---|
| 2,487,537 | 11/1949 | Gantner | 312/246 X |
| 2,755,158 | 7/1956 | Davidson | 312/323 |
| 3,039,642 | 6/1962 | Perkins | 206/19.5 R X |
| 3,460,877 | 8/1969 | De Boer | 312/246 |
| 3,519,319 | 7/1970 | Taylor | 312/246 |
| 3,586,394 | 6/1971 | Hecksel | 312/246 |

Primary Examiner—Paul R. Gilliam
Attorney—Gerald E. McGlynn, Jr., Paul J. Reising, Harold W. Milton, Jr. et al.

[57] ABSTRACT

An ash tray assembly of the type suitable for use in automotive vehicles including an integral plastic tray for receiving refuse and a metal support casing supporting the receptacle for movement between open and closed positions. A protrusion extends downwardly from the metal support and into the tray to coact with the rear wall of the tray to provide a stop means which limits opening movement of the tray. Projections extend from the sides of the tray and coact with grooves in the sidewalls of the metal support means for guiding movement of the tray between the open and closed positions. The rearmost projections on each side of the tray are disposed over a discontinuity or enlargement in the grooves when the tray is in the open position whereby the tray may be pivoted about a pair of more forward projections to move the rearmost projection downwardly into the enlargement thereby rendering ineffective the stop means by moving the rear wall out of interfering engagement with the downwardly extending protrusion to allow the tray to be removed from the support means. The enlargements in the grooves have slanted walls whereby the protrusions are forced into a wedged engagement with the sidewalls as the sidewalls flex outwardly thereby biasing the rearmost projections upwardly into the path of normal movement along the grooves.

15 Claims, 6 Drawing Figures

PATENTED JUN 5 1973

INVENTOR.
Edwin F. Clemett, Jr.
BY
Barnard, McGlynn & Reising
ATTORNEYS

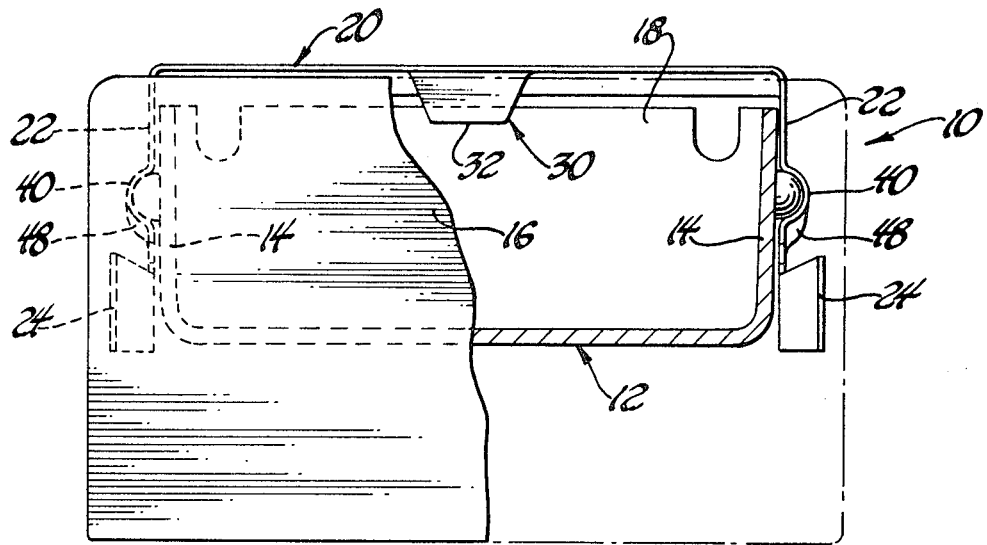
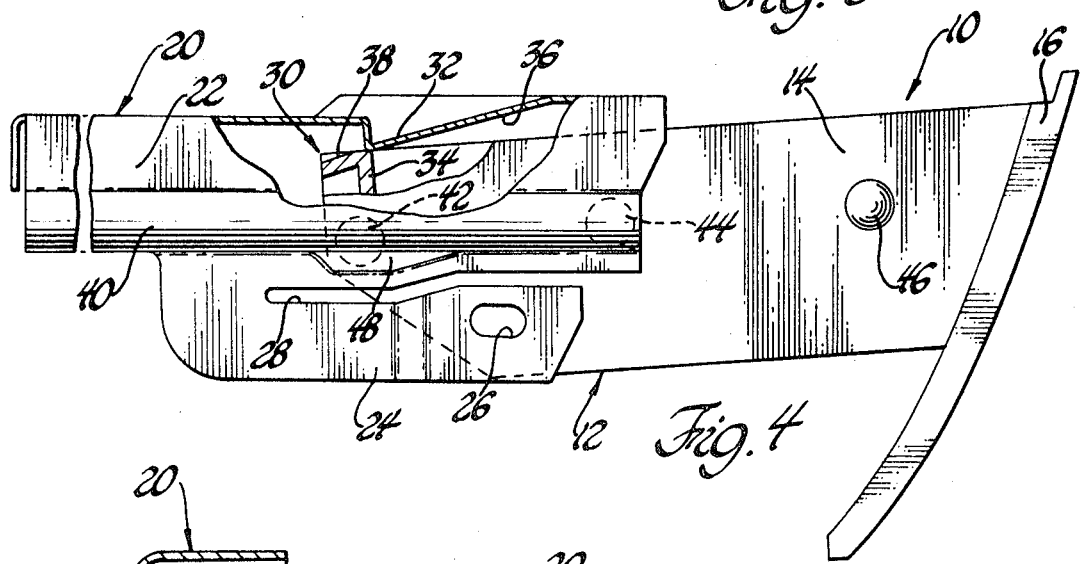
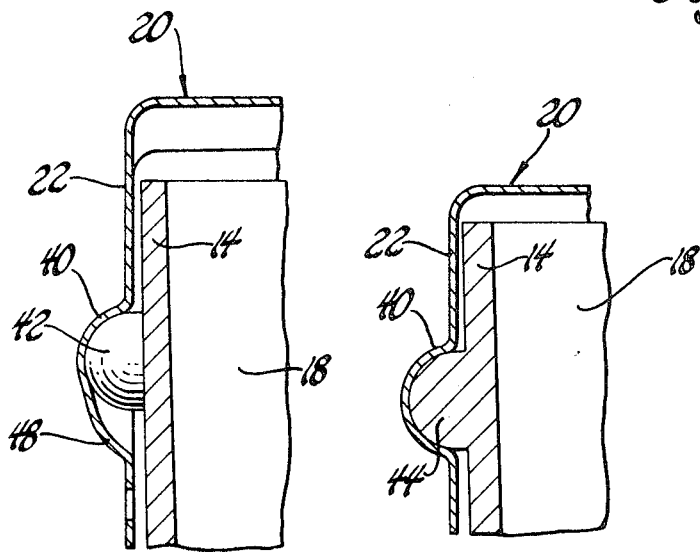
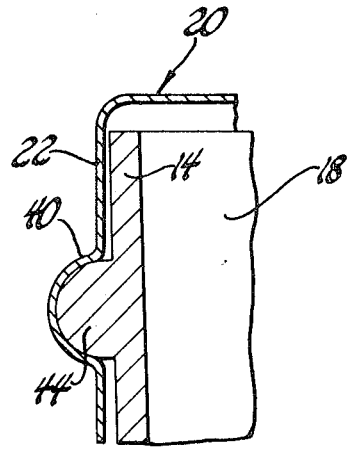

ASH TRAY ASSEMBLY

This invention relates to an ash tray assembly of the type suitable for use in automotive vehicles. Normally such assemblies are disposed in the dashboard of an automobile whereby the receptacle or tray may be moved outwardly to an open position. Such assemblies must have the capability of allowing the receptacle or tray to be removed from its support to allow the tray to be emptied.

Although such assemblies must provide the capability of allowing the receptacle or tray to be removed from the support means, the receptacle or tray is normally movable between closed and open positions and some special manipulation of the tray is necessary in order to remove the tray from the support means. Normally this is accomplished by a movable tab or leaf spring disposed in the center and at the rear of the tray. This tab or support spring normally engages a stop in the support means but may be manually moved out of engagement with the stop to allow the receptacle or tray to be removed from the support means. Examples of such an assembly are shown in U.S. Pats. Nos. 2,462,397; 2,809,977; 3,460,877 and 3,521,938.

Although such assemblies work very satisfactorily they do include moving parts in that the centrally disposed tab must be movable and because of its structure the trays are not susceptible to unitary or integral construction.

Accordingly, it is an object and feature of this invention to provide an ash tray assembly including receptacle means for receiving refuse and support means for supporting the receptacle means for movement between open and closed positions with stop means for limiting opening movement of the receptacle means in the open position and guide and follower means interconnecting the receptacle means and support means for guiding movement of the receptacle means between open and closed positions and for allowing the receptacle means to be moved to a movable position rendering the stop means ineffective to allow the receptacle means to be removed from the support means thereby eliminating moving parts and facilitating the use of an integral one piece receptacle means.

In correlation with the foregoing object and feature it is another object and feature of this invention to provide such an assembly wherein the guide and follower means includes at least one guideway and at least one follower guided by the guideway along a path as the receptacles move between open and closed positions.

In correlation with the foregoing objects and features it is another object and feature of this invention to provide such an assembly wherein the guideway has a discontinuity means for allowing the follower to be moved out of the path of movement to render the stop means ineffective for removal of the receptacle means.

In correlation with the foregoing objects and features, it is another object and feature of this invention to provide biasing means for biasing the follower out of the discontinuity means and into the path of movement between the open and closed positions.

Other objects and attendant advantages of the present invention will be readily appreciated as the same becomes better understood by reference to the following detailed description when considered in connection with the accompanying drawings wherein:

FIG. 3 is a view taken substantially along line 3—3 of FIG. 1 and partially broken away and in cross section;

FIG. 4 is an elevational view partially broken away and in cross section similar to FIG. 1 but showing the receptacle or tray in the open position;

FIG. 5 is a fragmentary cross sectional view taken substantially along line 5—5 of FIG. 1; and FIG. 6 is a fragmentary cross sectional view taken substantially along lines 6—6 of FIG. 1.

Figure 1:
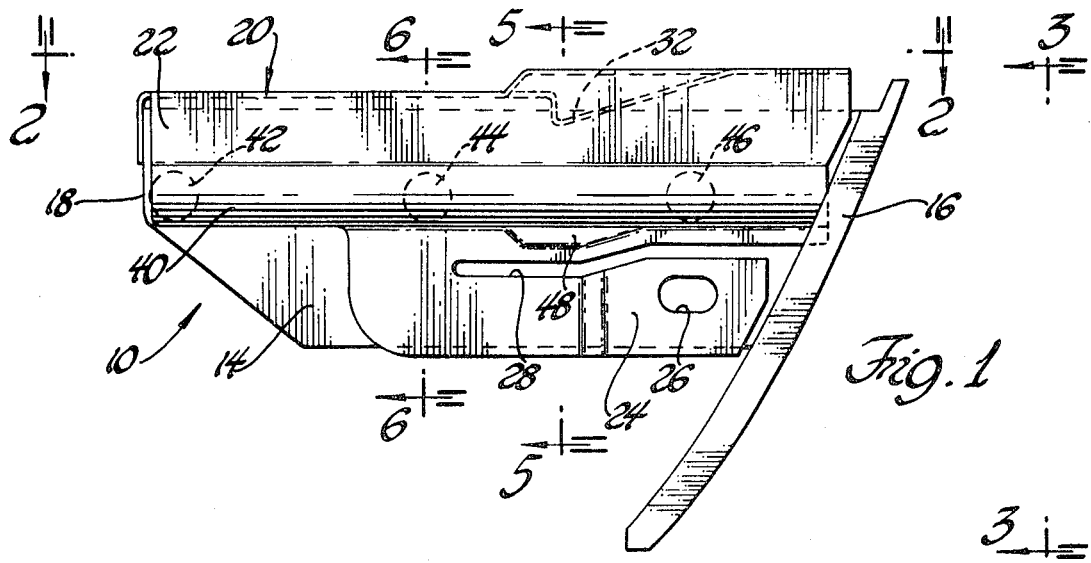
FIG. 1 is an elevational view of a preferred embodiment of the instant invention and showing the receptacle means in the closed position.
Figure 2:
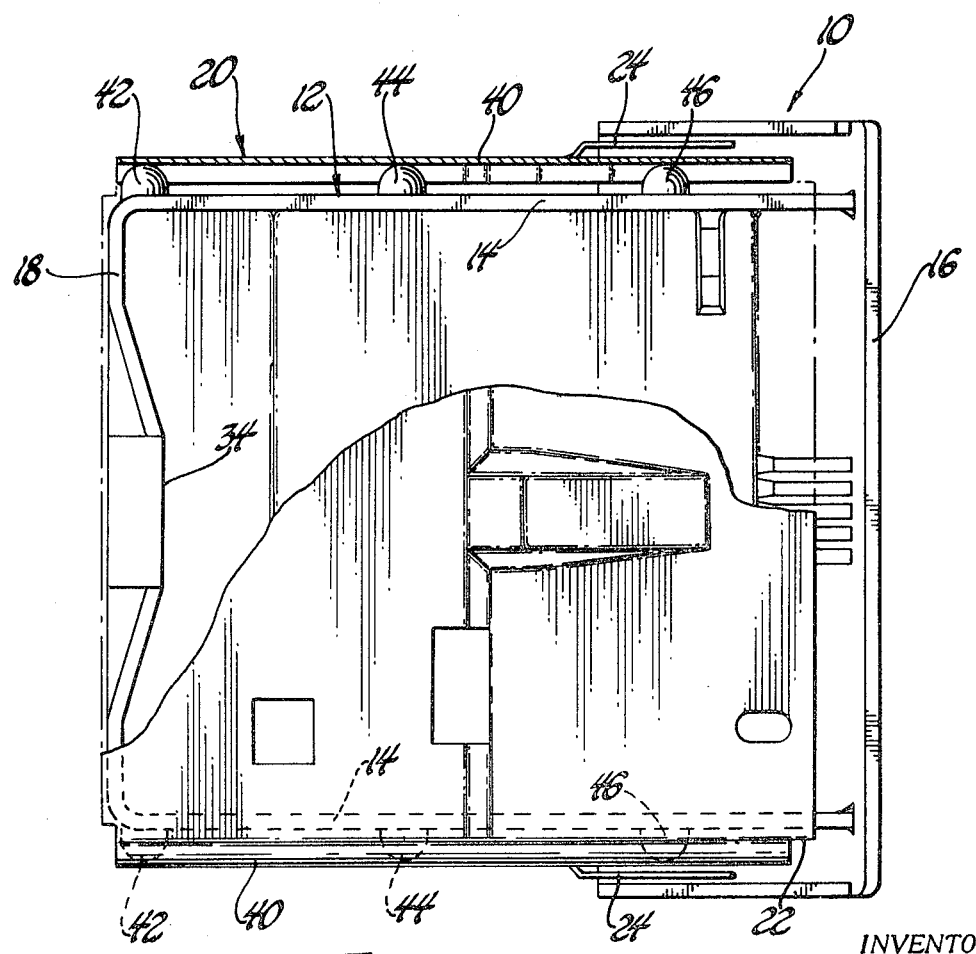
FIG. 2 is a view taken substantially on line 2—2 of FIG. 1 and showing the assembly partially broken away and in cross section.

Referring now to the drawings, an ash tray assembly of the type suitable for use in automotive vehicles and constructed in accordance with the instant invention is generally shown at 10.

The assembly 10 includes a receptacle means for receiving refuse and takes the form of an integral one piece plastic tray generally indicated at 12. The tray 12 includes spaced generally parallel sides 14 and front and rear walls 16 and 18 respectively interconnecting the sides 14. The front wall 16 is decorative and extends downwardly below the bottom of the tray 12.

The assembly also includes support means comprising the metal casing generally indicated at 20 supporting the tray 12 for movement between open and closed positions. The casing 20 is preferably made of metal and includes sidewalls 22. The sidewalls 22 include lower attaching arms 24 having holes 26 therein for attaching the metal casing 20 to vehicle structure. A slot 28 separates the arm 24 from the remainder of the side 22 to allow the side 22 to be flexible or movable outwardly, the purpose of which will become more clear hereinafter.

There is also included stop means generally indicated at 30 in FIGS. 3 and 4 for limiting opening movement of the tray 12 to establish the open position. More specifically, the stop means 30 includes a protrusion 32 extending downwardly into the open top of the tray 12 and an abutment 34 formed in the rear wall 18 of the tray. The protrusion 32 coacts with the abutment 34 of the rear wall to limit opening movement of the tray 12. As illustrated in FIG. 4, the protrusion 32 and the abutment 34 of the rear wall 18 have inclined ramps 36 and 38 which coact with one another during insertion of the tray into the support means 20 to facilitate the movement of the abutment 34 past the protrusion 32 during such insertion.

The assembly 10 also includes guide and follower means interconnecting the tray 12 and the support means 20 for guiding movement of the tray 12 between the open and closed positions and for allowing the tray 12 to be moved to a removal position as illustrated in FIG. 4 rendering the stop means 30 ineffective thereby allowing the tray 12 to be removed from the support means 20. More specifically, the guide and follower means includes the guideways or grooves 40 and the followers or projections 42, 44 and 46. The followers or projections 42, 44 and 46 are guided by the guideways or grooves 40 along a path so that the projections move along the grooves as the tray is moved between the open and closed positions. It will be noted that there is a groove 40 extending along each side wall 22 of the metal support means 20 and there are three projections integral with and extending from each side 14 of the tray 12 whereby the projections 42, 44 and 46 in the grooves 40 interconnect the sides 14 of the tray 12 and the adjacent sidewalls 22 of the support means 20. The first and second projections 42 and 44 are always disposed in the grooves 40 when the tray 12 is moved between the open and closed positions whereas the third projection 46 on each side 14 is disposed out of the associated grooves 40 when the receptacle or tray 12 is in the open position.

Each guideway or groove 40 includes a discontinuity means defined by an enlarged portion 48 for allowing the follower or projection 42 to be moved out of the path of movement of the projection along the groove 40 during movement between the open and closed positions to render the stop means 30 ineffective for removing the tray 12. More specifically, the first followers or projections 42 are aligned with the discontinuity means 48 when the tray is in the open position and the second projections 44 coact with the grooves 40 so that the tray may be rotated about the central axis of the second projections 44 to move the first projections or followers 42 out of the path and into the discontinuity means 48 as shown in FIG. 4 for rendering the stop means 30 ineffective.

There is also included biasing means for biasing the first follower or projections 42 out of the discontinuity means or enlarged portion 48 and back into the normal path along the grooves 40. The biasing means may take many forms but it comprises a slanted flexible wall defining the enlarged portion 48 as best shown in FIG. 5 so that the first projections 42 move into increased wedging engagement with the slanted walls of the sockets or enlarged portion 48 as it moves into the enlarged portions 48 whereby the first projections 42 are urged back into the normal path of movement along the grooves 40. The support means 20 is metal and the slanted walls of the enlargements 48 are flexible by reason of the upper portions of the side walls 22 of the support means being flexible as described hereinbefore as facilitated by the slots 28.

The operation of the device is quite simple in that the tray 12 may be inserted into the support means 20 by moving the projections 42, 44 and 46 along the grooves 40. The tray 12 is normally moved between the open and closed positions and when in the open position further outward movement is limited by reason of the abutment 34 of the rear wall 18 coacting with the protrusion 32 which extends downwardly from the top of the metal casing 20. If it is desired to remove the tray 12 for emptying, the tray is moved to the position illustrated in FIG. 4 where the front portion is pivoted upwardly about the axis of the second projections 44 to move the first projections 42 downwardly to the removal position illustrated.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An ash tray assembly of the type suitable for use in automotive vehicles comprising: receptacle means for receiving refuse, support means supporting said receptacle means for movement between open and closed positions, stop means for limiting opening movement of said receptacle means to establish said open position, guide and follower means interconnecting said receptacle and support means for guiding movement of said receptacle means between said open and closed positions and for allowing said receptacle means to be moved to a removal position rendering said stop means ineffective to allow said receptacle means to be removed from said support means, said guide and follower means including at least one guideway and at least one follower guided by said guideway along a path so that said follower moves along said guideway as said receptacle means is moved between said open and closed positions, said guideway including a discontinuity means for allowing said follower to be moved out of said path to render said stop means ineffective for removal of said receptacle means, and biasing means for biasing said follower out of said discontinuity means and into said path.

2. An assembly as set forth in claim 1 wherein said receptacle means includes spaced generally parallel sides and said support means includes side walls adjacent said sides of said receptacle means, and said guide and follower means includes one of said guideways and at least one of said followers interconnecting each side of said receptacle to the adjacent side wall of said support means.

3. An assembly as set forth in claim 2 including first and second followers coacting with each of said guideways.

4. An assembly as set forth in claim 3 wherein said receptacle means comprises an upwardly open tray having front and rear walls interconnecting said sides, said stop means includes a protrusion extending downwardly into said tray to coact with said rear wall to limit opening movement of said tray.

5. An assembly as set forth in claim 3 wherein said first follower is aligned with said discontinuity means when said tray is in said open position and said second follower is coacting with said guideway so that said tray may be rotated about an axis of said second follower to move said first follower out of said path and into said discontinuity means for rendering said stop means ineffective.

6. An assembly as set forth in claim 5 wherein each of said guideways comprises a groove and each of said followers comprises a projection.

7. An assembly as set forth in claim 6 including biasing means for biasing said first follower out of said discontinuity means and into said path.

8. An assembly as set forth in claim 7 wherein said discontinuity means comprises an enlarged portion in each of said grooves.

9. An assembly as set forth in claim 8 wherein said biasing means comprises a slanted flexible wall defining said enlarged portion so that said first projection moves into increased wedging engagement with said slanted wall as it moves into said enlarged portion whereby said first projection is urged back into said path.

10. An assembly as set forth in claim 9 wherein said grooves are in said side walls of said support means and said projections extend from said tray.

11. An assembly as set forth in claim 10 wherein said tray is an integral plastic member.

12. An assembly as set forth in claim 11 wherein said support means is metal and said slanted wall is flexible by reason of said side walls of said support means being flexible.

13. An assembly as set forth in claim 12 including a third projection coacting with each of said grooves, said third projections being disposed out of said grooves when said receptacle is in said open position.

14. An assembly as set forth in claim 13 wherein said receptacle means comprises an upwardly open tray having front and rear walls interconnecting said sides, said stop means includes a protrusion extending downwardly into said tray to coact with said rear wall to limit opening movement of said tray.

15. An assembly as set forth in claim 14 wherein said protrusion and said rear wall have inclined ramps which coact with one another during insertion of said tray into said support means to facilitate movement of said rear wall past said protrusion during such insertion.

* * * * *